(12) United States Patent
Mather et al.

(10) Patent No.: US 7,243,978 B2
(45) Date of Patent: Jul. 17, 2007

(54) DOOR ASSEMBLY FOR A VEHICLE

(75) Inventors: Carl Mather, Lake Orion, MI (US); Todd R Teasdale, Canton Township, MI (US); Samer Shamon, Sterling Heights, MI (US); William E Hughes, Oxford, MI (US); Daniel T Griffin, Waterford, MI (US); David E Dawkins, Rochester Hills, MI (US); Richmond P Thomas, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/252,672

(22) Filed: Oct. 18, 2005

(65) Prior Publication Data

US 2007/0085374 A1    Apr. 19, 2007

(51) Int. Cl.
*B60J 5/06* (2006.01)
(52) U.S. Cl. .......................................... 296/155; 49/360
(58) Field of Classification Search ................. 296/155; 49/352, 360, 375, 348; 280/804
See application file for complete search history.

(56) References Cited

U.S. PATENT DOCUMENTS

| | | | | |
|---|---|---|---|---|
| 4,544,198 A | * | 10/1985 | Ochiai et al. ............... | 296/155 |
| 4,606,146 A | * | 8/1986 | Jozefozak ..................... | 49/216 |
| 5,896,704 A | * | 4/1999 | Neag et al. .................. | 296/155 |
| 5,934,022 A | * | 8/1999 | Faubert ........................ | 49/360 |
| 6,134,837 A | * | 10/2000 | Kawanobe et al. ........... | 49/360 |
| 6,164,015 A | * | 12/2000 | Kawanobe et al. ........... | 49/360 |
| 6,328,374 B1 | * | 12/2001 | Patel .......................... | 296/155 |
| 6,539,670 B2 | * | 4/2003 | Haag et al. ................... | 49/360 |
| 6,588,829 B2 | * | 7/2003 | Long et al. .................. | 296/155 |
| 6,637,803 B2 | * | 10/2003 | Moreau ...................... | 296/155 |
| 6,779,832 B2 | * | 8/2004 | D'Assumcao ............... | 296/155 |
| 6,781,058 B1 | * | 8/2004 | DeCicco et al. ............. | 296/155 |
| 6,904,717 B2 | * | 6/2005 | Clark et al. ................... | 49/360 |
| 6,926,342 B2 | * | 8/2005 | Pommeret et al. .......... | 296/155 |
| 2002/0153744 A1 | * | 10/2002 | Long et al. .................. | 296/155 |
| 2003/0005640 A1 | * | 1/2003 | Moreau ....................... | 49/360 |
| 2004/0221511 A1 | * | 11/2004 | Rogers et al. ................ | 49/360 |
| 2006/0225358 A1 | * | 10/2006 | Haag et al. ................... | 49/360 |

* cited by examiner

*Primary Examiner*—Kiran B. Patel
(74) *Attorney, Agent, or Firm*—Thomas A. Jurecko

(57) ABSTRACT

A door assembly for a vehicle is provided. The door assembly includes a guide track attached to a door, a slider positioned within the guide track, and a connecting member connecting the slider to the vehicle door frame. The connecting member has a vehicle end and a slider end and is arranged to be attached to the vehicle at the vehicle end and to the slider at the slider end. The connecting member and the slider are arranged to enable the door to translate relative to the vehicle along the guide track.

5 Claims, 2 Drawing Sheets

DOOR ASSEMBLY FOR A VEHICLE

FIELD OF THE INVENTION

The present invention relates generally to a door assembly for a vehicle.

BACKGROUND OF THE INVENTION

Generally, for vehicle access, two types of doors are provided: hinged doors arranged to pivot about an end of the door, and sliding doors arranged to translate along a guided track. Sliding doors are desirable for certain applications, such as providing greater access in close parking environments like small garages and crowded parking lots.

A typical sliding door assembly involves a channel mounted along the exterior of a vehicle for receiving a slideable door member. However, in some automotive applications use of an exterior channel is not feasible, such as with a pick-up truck, for example, where there is a gap between the cab and the truck bed precluding the use of such a channel.

Thus, there exists a need for an improved sliding door arrangement that overcomes the aforementioned and other disadvantages.

SUMMARY OF THE INVENTION

Thus, in accordance with one aspect of the present invention, a door assembly for a motor vehicle is provided. The door assembly includes a door arranged to be slideably mounted to a vehicle, a guide track attached to the door, a slider positioned within the guide track, and a connecting member having a vehicle end and a slider end. The connecting member is arranged to be attached to the vehicle at the vehicle end and attached to the slider at the slider end. The connecting member and slider are also arranged to enable the door to translate relative to the vehicle along the guide track.

In accordance with another aspect of the present invention, a door assembly is provided wherein the guide track, the slider, and the connecting member are arranged to enable the door to translate relative to the vehicle between an open position and a closed position while keeping the door substantially parallel to a vehicle exterior.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENT(S)

Figure 1:
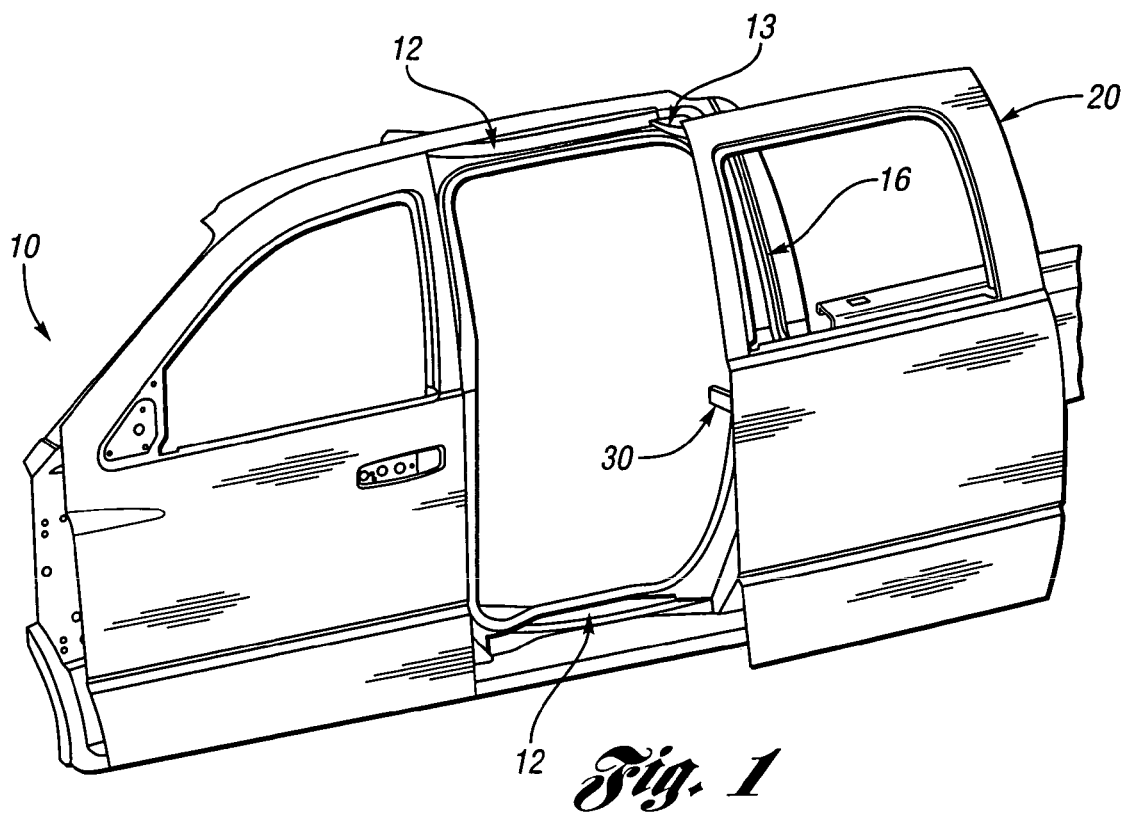
FIG. 1 shows a vehicle exterior having a sliding door in accordance with the present invention.
Figure 2:
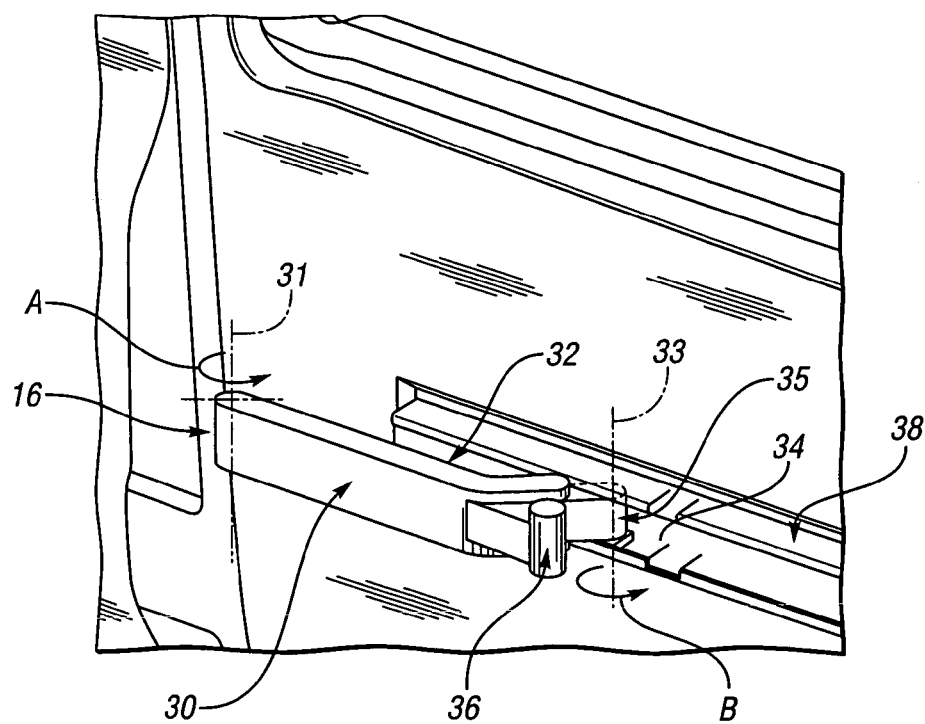
FIG. 2 shows a close-up view of a sliding door apparatus in a closed position in accordance with the present invention.

Referring to FIGS. 1 and 2, a vehicle cab 10 is shown, such as the cab of a pick-up truck, having a door 20 mounted to a vehicle door frame 16. According to a first exemplary embodiment, door 20 is connected to the door frame 16 by connecting arm 30. A guide track 38 is connected to the door 20. A slider 32 is positioned within the guide track 38 and connected to the connecting arm 30 through a fastener 35. The fastener 35 may be a pivotable fastener, such as a screw or bolt assembly, arranged to enable the connecting arm 30 to pivot relative to the slider about axis 33 in the direction of arrow B. A rotation guide member 36 positioned on the connecting arm 30 is arranged to engage a channel 34 to stop rotation of the connecting arm 30. The connecting arm 30 may further be pivotally connected to vehicle door frame 16, as illustrated by axis 31, the connecting arm 30 being arranged to pivot in the direction of arrow A.

Figure 3:
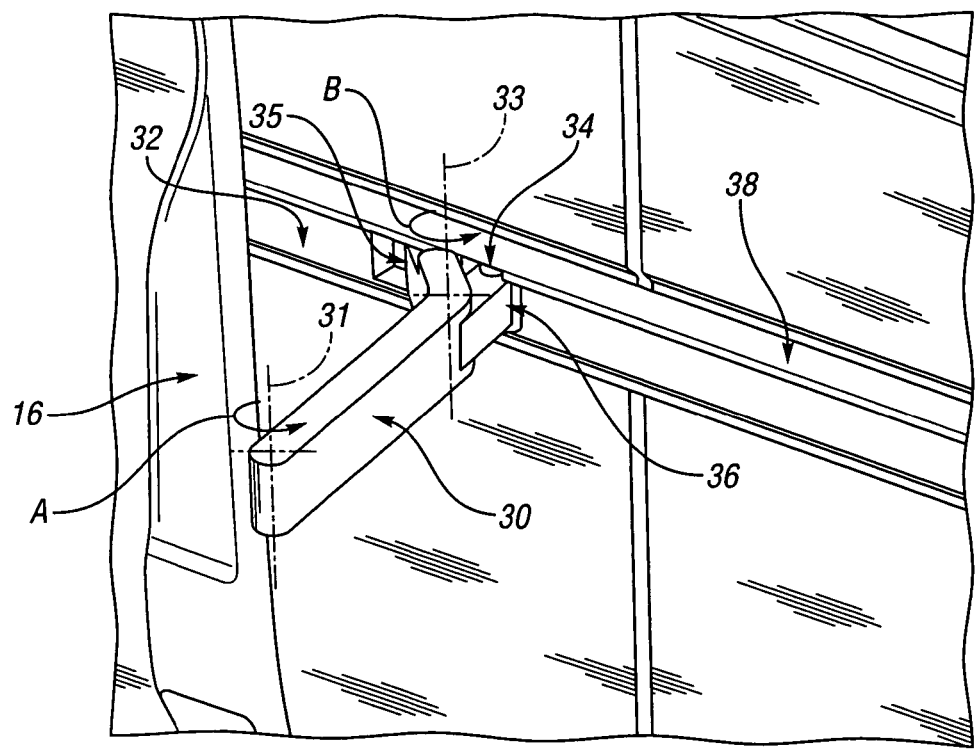
FIG. 3 shows a close-up view of a sliding door apparatus in a sliding position in accordance with the present invention.
Figure 4:
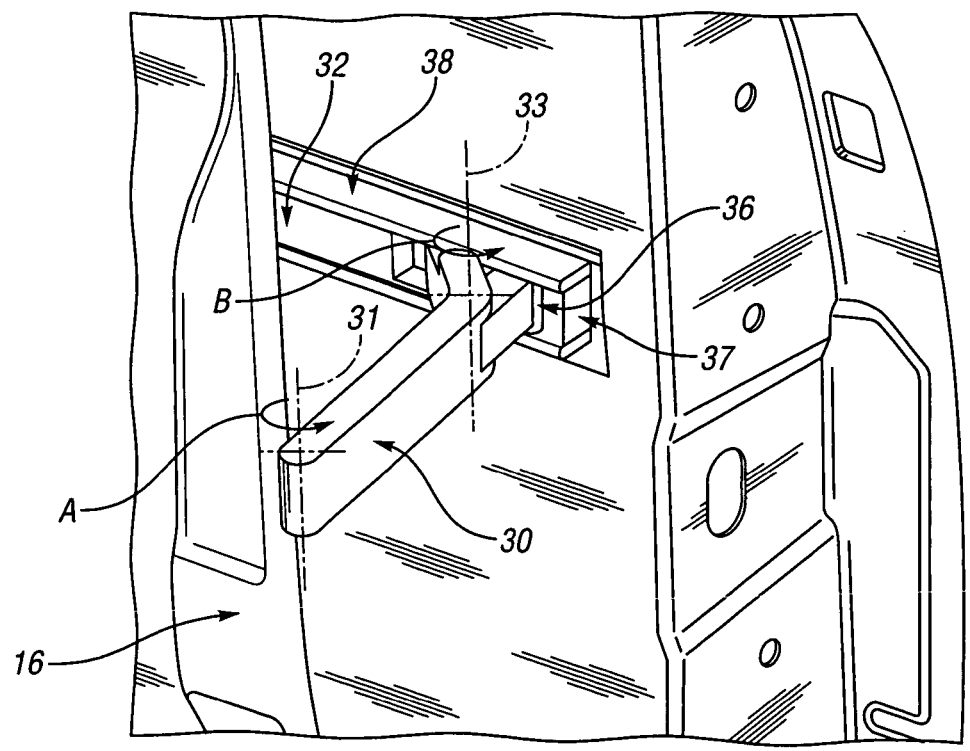
FIG. 4 shows a close-up view of a sliding door apparatus in an open position in accordance with the present invention.

The disclosed arrangement creates a linkage system whereby the rotation of connecting member 30 serves to move the door 20 out, away from the vehicle cab 10, so that it is in position to slide along the guide track as shown in FIGS. 2-4.

Referring to FIG. 3, connecting member 30 is pivoted about points 31 and 33 (in the direction of arrows A and B, respectively) until rotation guide member 36 engages channel 34. The door 20 is generally parallel to the vehicle exterior 10, while connecting member 30 is generally perpendicular to the vehicle exterior 10 and door 20. It should be noted that the specific geometric relationship between the connecting member 30, the door 20, and the vehicle exterior 10 could be altered without departing from the spirit and scope of the invention. In addition, rotation guide member 36 may further comprise roller material, such as a ball bearing or a roller bearing, allowing it to more easily translate within the guide track 38.

Referring to FIG. 4, once the rotation guide member 36 has engaged the channel 34, the guide track 38 and door 20 are then able to translate relative to the connecting arm 30 and the door frame 16 until rotation guide member 36 engages translation guide member 37. At this point, the door 20 is said to be in an open position, allowing full ingress/egress to the vehicle cab 10.

According to a second exemplary embodiment, the door assembly further comprises additional guide tracks 12, located at the top and bottom of the vehicle door frame 16, and additional connecting members 13 located at the top and bottom of the door 20 to further support vehicle door 20 throughout its motion.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door assembly for a motor vehicle comprising:
   a door arranged to be slideably mounted to a vehicle;
   a guide track attached to the door;
   a slider positioned within the guide track; and
   a connecting member having a vehicle end and a slider end, the connecting member comprising a swing arm arranged to be pivotally attached to the vehicle at the vehicle end and pivotally attached to the slider at the slider end, the swing arm and slider arranged to enable the door to pivot between a closed position and a sliding position, to translate relative to the vehicle along the guide track, and to be flush to a vehicle exterior when in the closed position and extended away from the vehicle exterior when in the sliding position;

the swing arm further including a rotation guide member arranged to engage the guide track to limit rotation of the swing arm when the door is in the sliding position.

2. The door assembly of claim 1 wherein the guide track, the slider, and the connecting member are arranged to enable the door to translate relative to the vehicle between an open position and a closed position while keeping the door substantially parallel to a vehicle exterior.

3. The door assembly of claim 1 further including;
    at least one additional guide track arranged to be attached to the vehicle;
    at least one additional slider positioned within the at least one additional guide track; and
    at least one additional connecting member having a slider end and a door end, the at least one additional connecting member being attached to the slider at the slider end and attached to the door at the door end;
    wherein the at least one additional guide track, the at least one additional slider, and the at least one additional connecting member are arranged to enable the door to translate relative to the vehicle along the at least one additional guide track.

4. The door assembly of claim 1 wherein the guide track further includes:
    a first guide member arranged to engage the slider when the door is in a closed position; and
    a second guide member arranged to engage the slider when the door is in an open position.

5. The door assembly of claim 1 wherein the door is arranged to translate in a generally horizontal direction.

* * * * *